United States Patent
Yu (10) Patent No.: US 6,726,395 B2
(45) Date of Patent: Apr. 27, 2004

(54) COLLAPSIBLE SUPPORT ROD WITH ADJUSTABLE THREADED JOINT

(76) Inventor: Alexander Yu, 10F, No. 1-1, Lane 106, Sec. 3, Min-Chuan E. Road, Taipei (TW)

( * ) Notice: Subject to any disclaimer, the term of this patent is extended or adjusted under 35 U.S.C. 154(b) by 0 days.

(21) Appl. No.: 10/205,929

(22) Filed: Jul. 26, 2002

(65) Prior Publication Data

US 2004/0018043 A1 Jan. 29, 2004

(51) Int. Cl.[7] .................................................. F16B 7/18
(52) U.S. Cl. ...................................................... 403/296
(58) Field of Search ............................... 403/292, 296, 403/299, 300–302; 411/384, 395

(56) References Cited

U.S. PATENT DOCUMENTS

| | | | | |
|---|---|---|---|---|
| 1,921,530 A | * | 8/1933 | Lerch | 131/225 |
| 3,266,827 A | * | 8/1966 | Whicker | 403/24 |
| 4,067,656 A | * | 1/1978 | Dennis | 403/296 |
| 5,149,149 A | * | 9/1992 | Wu | 285/402 |
| 5,704,728 A | * | 1/1998 | Chan | 403/298 |
| 6,530,682 B2 | * | 3/2003 | Wu | 362/413 |
| 2003/0123927 A1 | * | 7/2003 | Wu | 403/292 |

* cited by examiner

Primary Examiner—James R. Brittain
(74) Attorney, Agent, or Firm—Frommer Lawrence & Haug, LLP; Ronald R. Santucci (57) ABSTRACT

A collapsible support such as a post includes two sections interconnected via first and second threaded joint units. The first joint unit includes a first male screw member engageable with a female screw of one of the sections, a first engaging end face formed at one end of the first male screw member, and a stem projecting outward axially from the first engaging end face. The second joint unit includes a second male screw member for engaging a female screw of the other section, which is sleeved rotatably around the stem and has a second engaging end face confronting the first engaging end face. A clamp member mounted on the stem clamps together the first and second male screw members. The first and second male screw members are interlockable via the first and second engaging end faces. A resilient member mounted on the stem permits the first and second male screw members to disengage from each other for adjustment of the angular positions of the two sections.

7 Claims, 7 Drawing Sheets

Figures 6A, 6B:
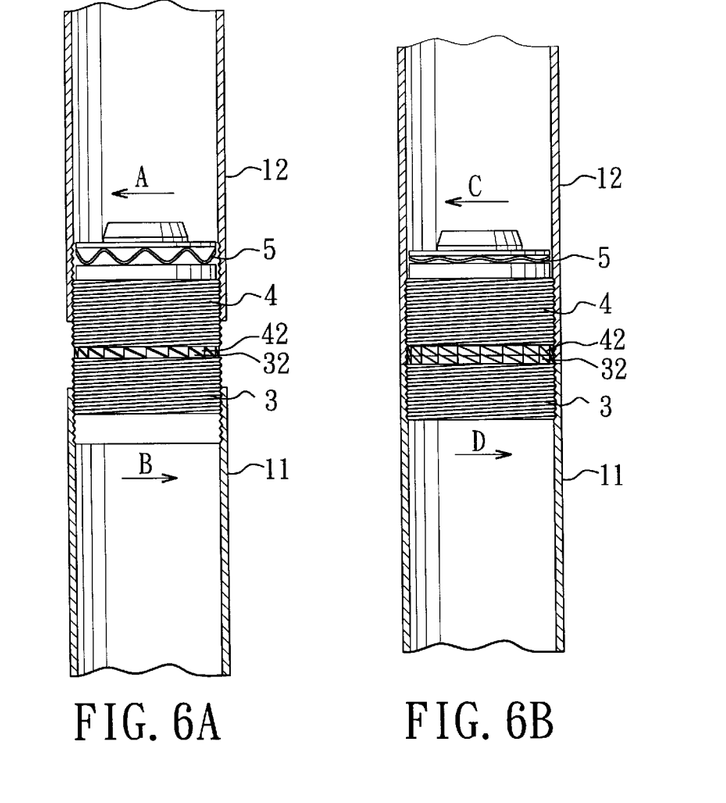

COLLAPSIBLE SUPPORT ROD WITH ADJUSTABLE THREADED JOINT

BACKGROUND OF THE INVENTION

1. Field of the Invention

This application relates to a collapsible support rod such as a post, a stand, or the like, and more particularly, to a collapsible support rod-which has at least two sections interconnected releaseably by using a threaded joint unit.

2. Description of the Related Art

It is known in the art to provide support rods or tubes such as posts, stands, etc., which are collapsible to form separate sections that can be kept in a compact size to facilitate transport or storage. Such-support rods are usually provided with releasable joints which interconnect separate rod sections so that the rod sections can be disassembled or re-assembled. A typical threaded joint unit includes male and female screws which are provided respectively on adjacent ends of two rod or tube sections to interlock threadedly the two rod or tube sections.

Generally, an upright post used in furniture, such as a floor lamp, has figures or patterns formed on the outer surface thereof for ornamentation purposes. FIG. 1 shows a floor lamp in which a post 1 is configured as a collapsible structure using a threaded joint 2. The threaded joint 2 interengages components 1*a* and 1*b* of the post 1, and the components 1*a*, 1*b* are rotated relative to each other to tighten the threaded joint 2. However, the post 1 encounters a problem in that, if the components 1*a*, 1*b* are rotated excessively or inadequately, complementary figures or patterns, such as longitudinal stripes, formed on the individual components 1*a*, 1*b* cannot be aligned consistently as shown in FIG. 2. To prevent this problem, male and female screw threads of the joint 2 have to be fabricated accurately so that, in assembly, the components 1*a*, 1*b* will make a precise number of turns according to the predetermined design of the threaded joint. The need to accomplish accuracy has complicated the manufacturing of the joint 2.

SUMMARY OF THE INVENTION

It is an object of the present invention to provide a collapsible support rod, such as a post or stand, with components which are adjustable in their relative angular positions after they are tightened to a threaded joint thereof, thereby eliminating the problem encountered with the prior art as described hereinbefore.

Accordingly, a collapsible support rod according to the present invention comprises: at least two sections each having at least one joint end formed with a female screw; a first threaded joint unit including a first male screw member engageable threadedly with the female screw of one of the sections, a first engaging end face formed at one end of the first male screw member, and a stem projecting outward axially from the first engaging end face; a second threaded joint unit including a second male screw member sleeved rotatably around the stem and having a second engaging end face confronting the first engaging end face, the second male screw member being engageable threadedly with the female screw of the other one of the sections; a clamp member mounted on the stem adjacent to one end of the second male screw member opposite to the second engaging end face to clamp the second male screw member against the first male screw member; and a resilient member sleeved around the stem between the clamp member and the first male screw member and being compressible along an axial direction, wherein the first male screw member is engageable resiliently with the second male screw member via the first and second engaging end faces and the resilient member, and the resilient member permits the first and second male screw members to disengage from each other for adjustment.

BRIEF DESCRIPTION OF THE DRAWINGS

Other features and advantages of the present invention will become apparent in the following detailed description of the preferred embodiments with reference to the accompanying drawings, of which:

FIG. 1 is a perspective view of a floor lamp in the prior art;

FIG. 2 is a fragmentary view of the floor lamp of FIG. 1;

FIG. 3 is an exploded view of an embodiment of a post for a floor lamp according to the present invention;

FIG. 4 is the same view as FIG. 3 but with the first and second male screw members being assembled together;

FIG. 5 is a fragmentary view of the post of FIG. 3;

FIG. 6A is a schematic view showing that the first and second male screw members interlock;

FIG. 6B is another schematic view showing that the first and second male screw members move away from each other;

FIG. 6C is a sectional view of the post of FIG. 3;

FIG. 7 is the same view as FIG. 6C but with the corrugated annular plate being compressed;

FIG. 8 is an exploded view of another embodiment of the post according to the present invention;

FIG. 9 is the same view as FIG. 8 but with the first and second male screw members being assembled together;

FIG. 10 is a sectional view of the embodiment of FIG. 8;

FIG. 11 is the same view as FIG. 10 but with the first and second male screw members being disengaged from each other; and FIG. 12 is a sectional view of still another embodiment of the present invention.

DETAILED DESCRIPTION OF THE PREFERRED EMBODIMENTS

Referring to FIGS. 3 to 7, a support rod or post embodying the present invention is shown to include sections 11 and 12 which are interconnected via first and second threaded joint units which will be detailed hereinafter. Each section 11, 12 is hollow and has a female screw 13 at a joint end thereof. The first threaded joint unit includes a first male screw member 3 engageable threadedly with the female screw 13 of the section 11. The second threaded joint unit includes a second male screw member 4 engageable with the male screw 13 of the section 12.

The first male screw member 3 includes a first engaging end face 31 formed with a plurality of inclined teeth 32 which project axially and extend radially. A stem 33 extends axially from the first engaging end face 31. The second male screw member 4 includes a second engaging end face 41 formed with a plurality of inclined teeth 42 which project axially and extend radially. The second male screw member 3 is sleeved around rotatably on the stem 33 and the second engaging end face 41 confronts the first engaging end face 31. A resilient member in the form of a corrugated annular plate 5 is sleeved onto the stem 33 adjacent to one side of the second male screw member 4 opposite to the second engaging end face 41. The annular plate 5 is compressible along an axial direction and has a plurality of corrugations 51, 52 which extend radially and project alternately in two opposite axial directions. A substantially C-shaped clamp plate 6 is received in an annular groove 34 of the stem 33 to clamp the annular plate 5 and the second male screw member 4 against the first male screw member 3. After the clamp plate 6 is assembled on the stem 33, the inclined teeth 32, 42 formed on the first and second engaging end faces 31, 41 interlock. Note that the inclined teeth 32, 42 prevent the first and second male screw members 3, 4 from relative rotational movement when the first and second male screw members 3, 4 are turned respectively along directions (A) and (B), as shown in FIG. 6A. The first and second male screw members 3, 4 can rotate along directions (c) and (D) opposite to the directions (A) and (B) only when the corrugated annular member 5 is compressed to permit the first and second male screw members 3, 4 to move away from each other a limited distance as shown in FIG. 6B.

Figure 1:
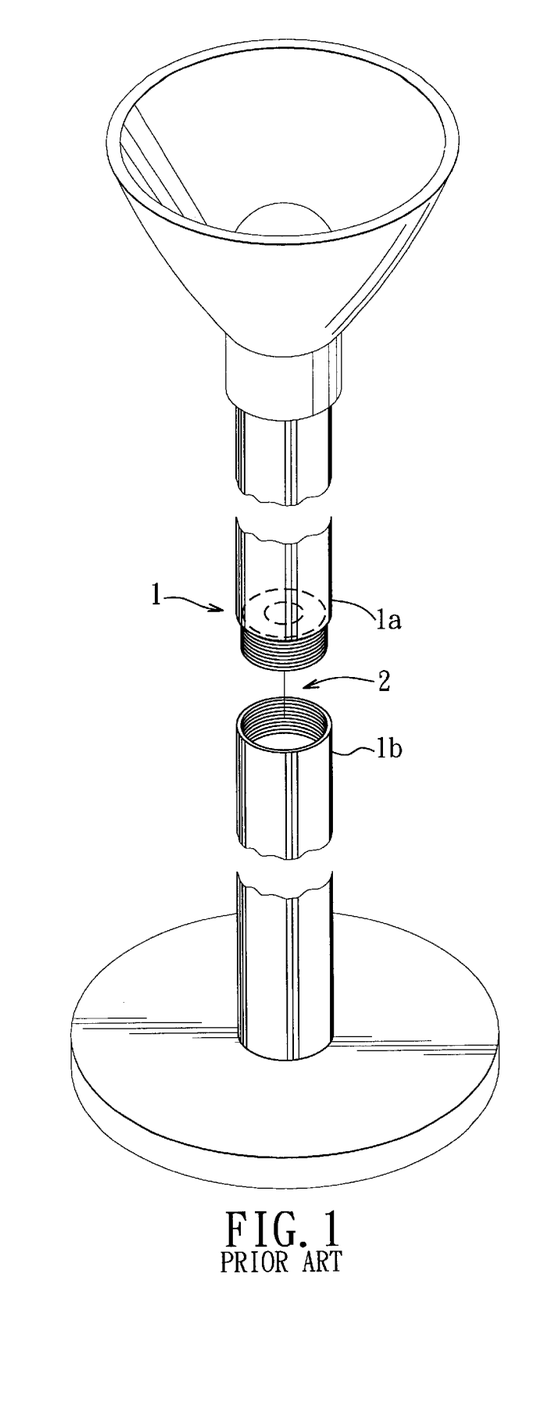
Figure 2:
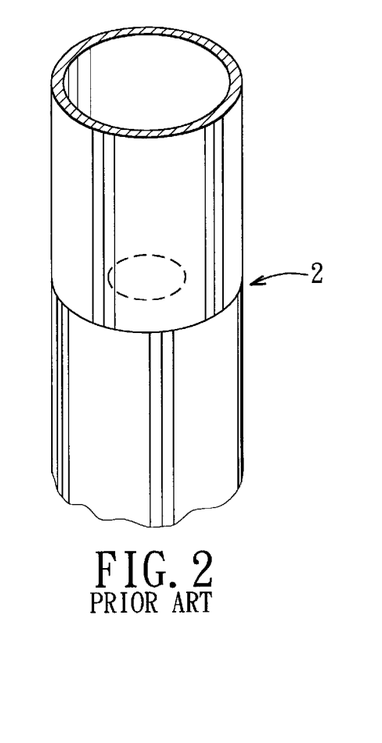
Figure 3:
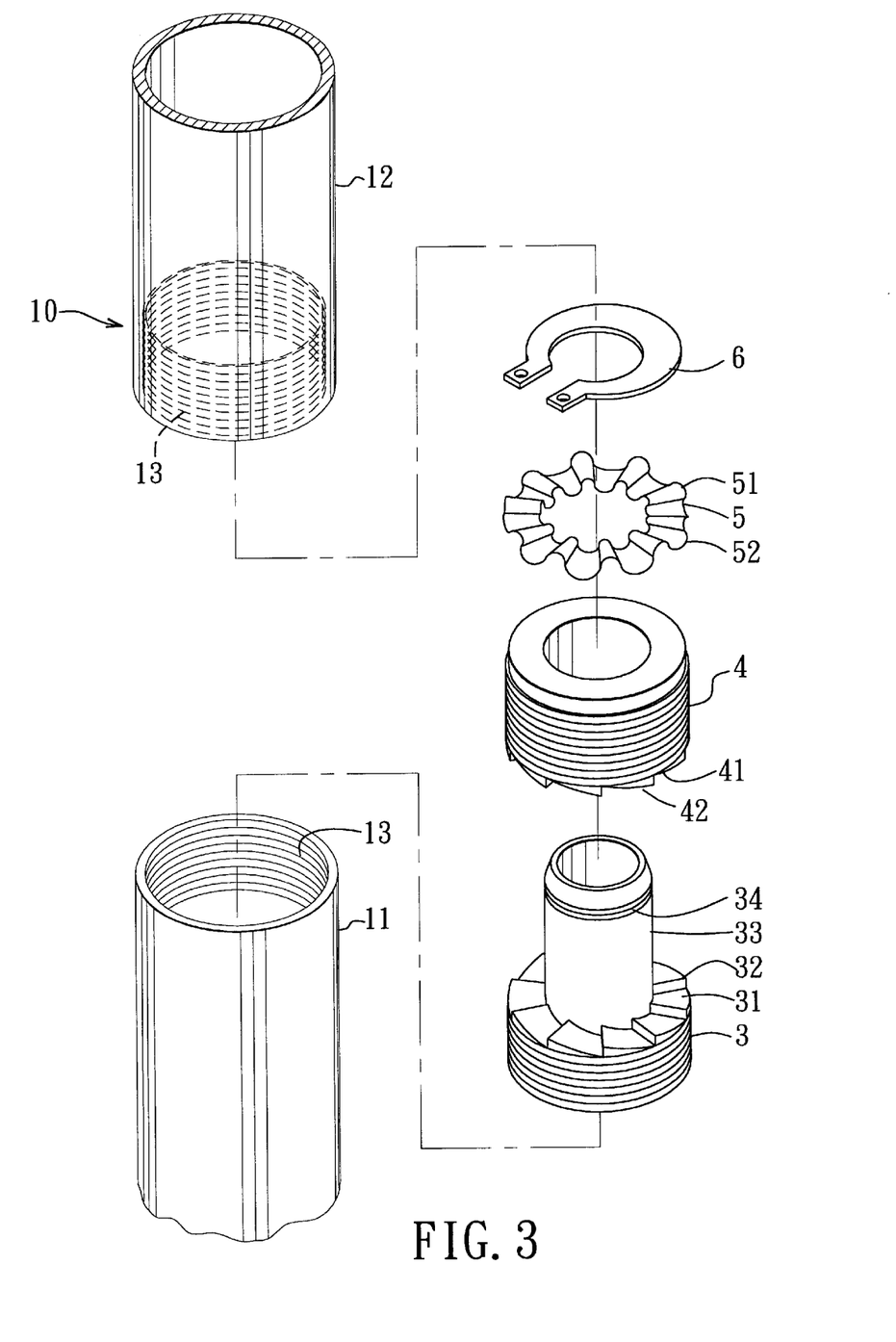
Figure 4:
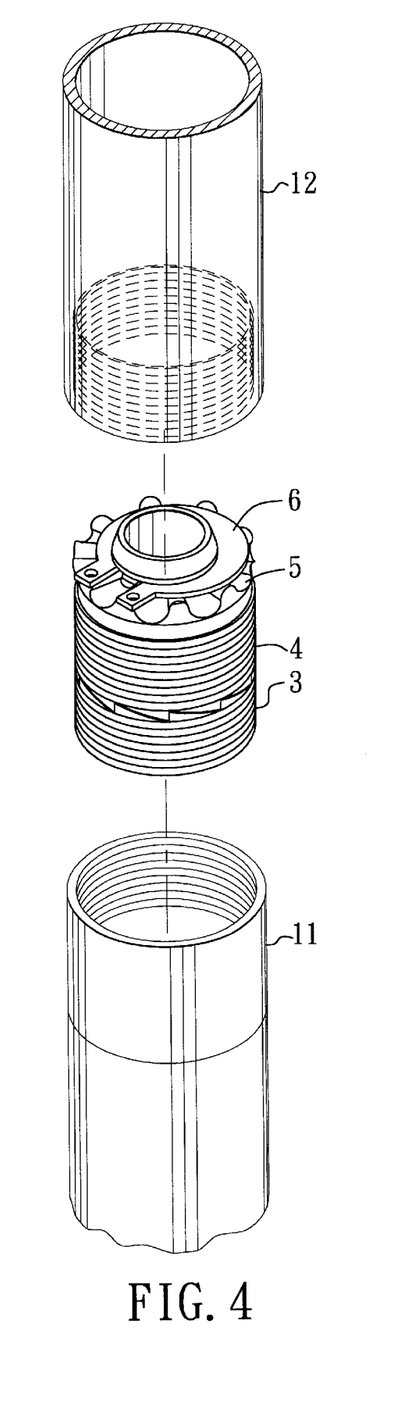
Figure 5:
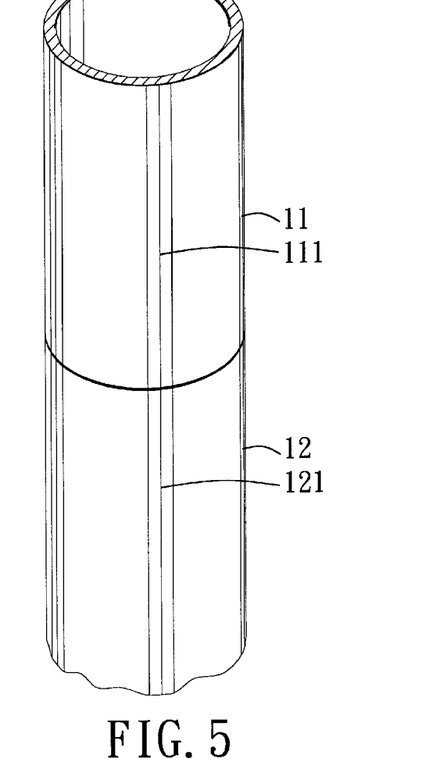
Figure 6C:
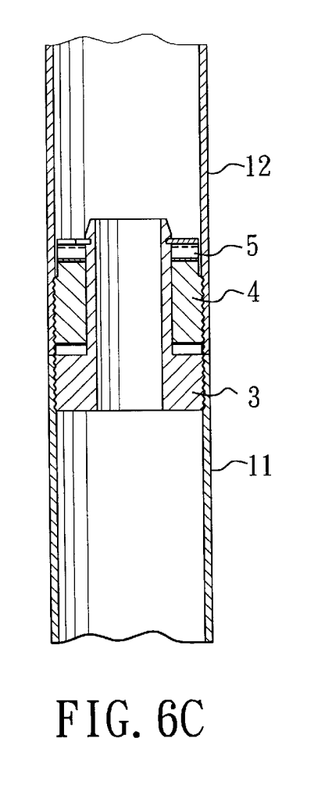
Figure 7:
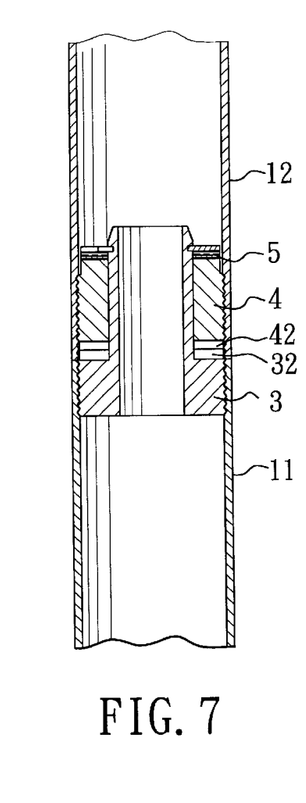
Figure 8:
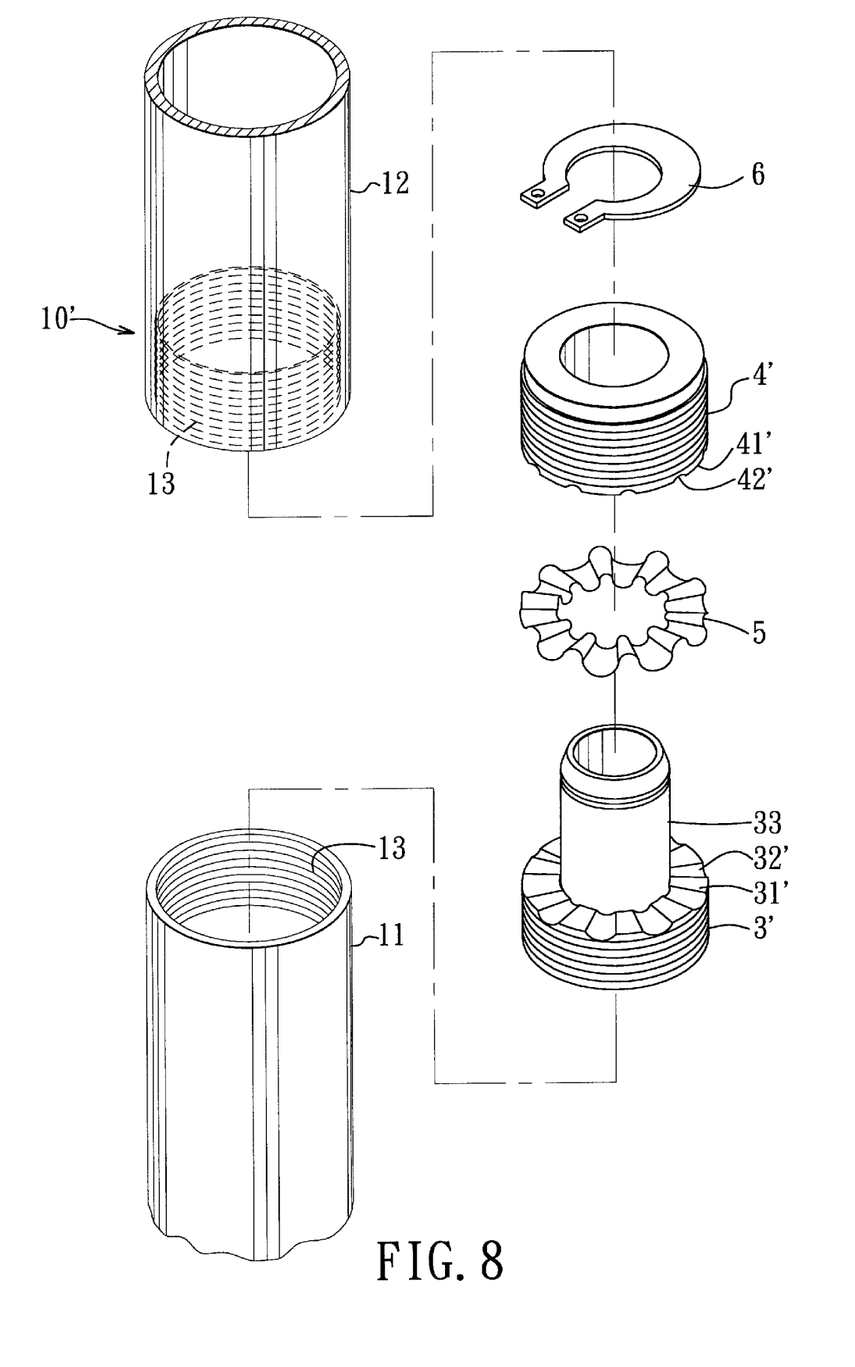
Figure 9:
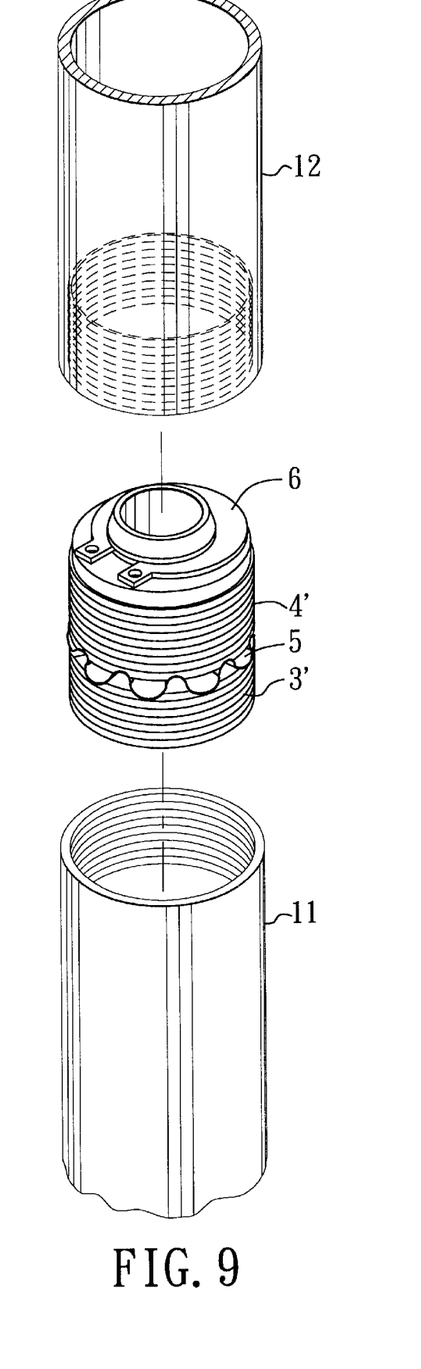
Figure 10:
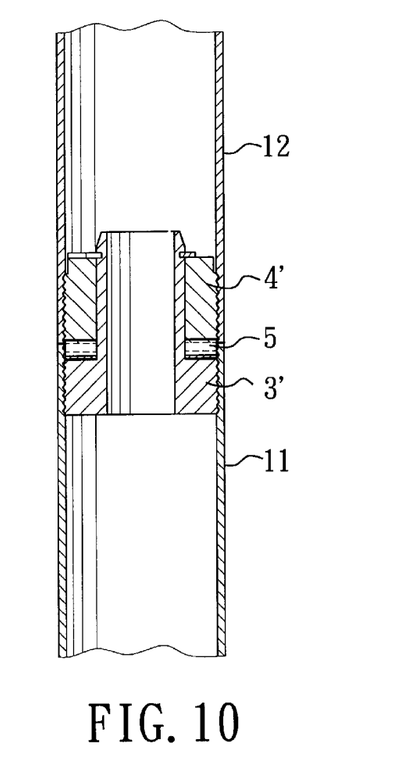
Figure 11:
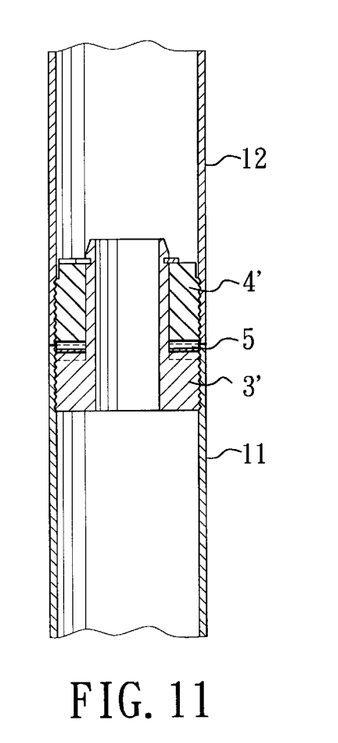

The post 10 is assembled by sleeving the sections 11, 12 onto the respective male screw members 3, 4 and by turning the sections 11, 12 along the directions (c) and (D) until the sections 11, 12 become tightened, as shown in FIG. 6C. In this situation, the first and second male screw members 3, 4 do not rotate relative to each other as they are caused to engage each other by the biasing force of the corrugated annular member 5. When the sections 11 and 12 are rotated further in the same directions, the corrugated annular member 5 is compressed, and the first and second male screw members 3 and 4 move away from each other, as shown in FIG. 7. The first and second male screw members 3, 4 can therefore be rotated relative to each other to adjust the relative annular positions of the sections 11 and 12 so as to align stripe patterns 111 and 121 as shown in FIG. 5. When the sections 11, 12 are to be disassembled, they may be turned along the directions (A) and (B).

Another post 10' embodying the present invention is illustrated in FIGS. 8 to 11, wherein elements conforming to those described in the previous embodiment are represented by like numerals. This embodiment differs from the previous embodiment in that this embodiment uses first and second male screw members 3' and 4'. The first and second male screw members 3' and 4' have respective first and second engaging end faces 31' and 41' which are formed respectively with grooves 32', 42' which extend radially. A corrugated annular plate 5 is disposed between the first and second engaging end faces 31' and 41'. The corrugations 51 and 52 of the annular plate 5 project respectively into the grooves 32', 42' of the first and second engaging end faces 31', 41'. The first and second engaging end faces 31', 41' engage each other resiliently due to the resiliency of the annular plate 5. Therefore, after the sections 11, 12 are tightened respectively to the first and second male screw members 3' and 4', the section 11 can still be turned relative to the section 12 to adjust the angular positions of the sections 11, 12.

Figure 12:
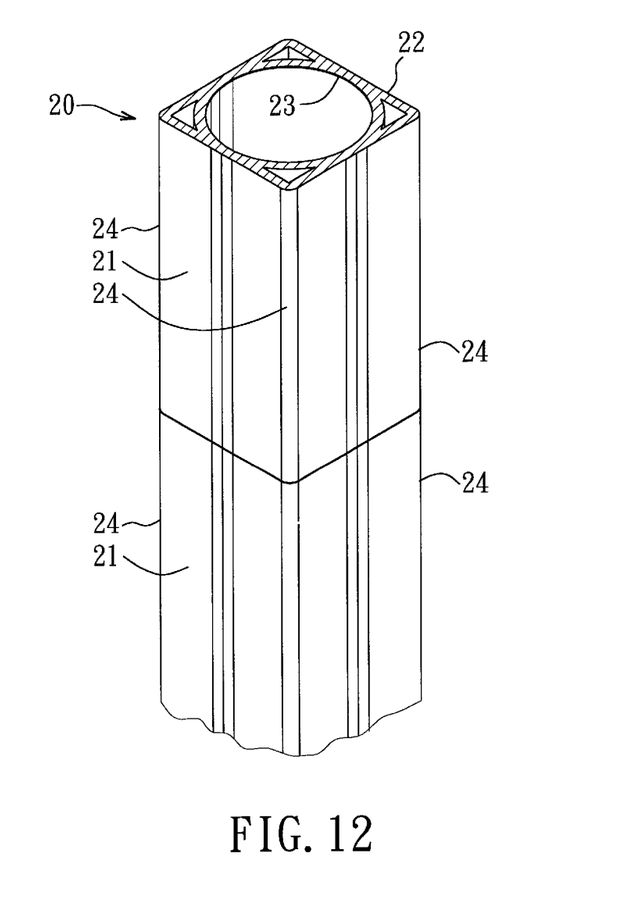

Referring to FIG. 12, still another embodiment of the present invention includes a post 20 which is composed of two sections 21 interconnected by first and second threaded joint units (not shown) and the resilient member (not shown) according to the present invention. Each section 21 has an outer peripheral wall 22 with a rectangular cross-section and an inner peripheral wall 23 with a circular cross-section. The inner peripheral wall 23 of each section 21 is provided with a male screw (not shown) at a joint end thereof. By virtue of the first and second threaded joint units and the resilient member used in the post 20, the sections 21 can be interconnected and adjusted to align the four corners 24 thereof.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A collapsible support rod comprising:
   a least two sections each having at least one joint end formed with a female screw; and
   a first threaded joint unit including a first male screw member engageable threadedly with said female screw of one of said sections, a first engaging end face formed at one end of said first male screw member, and a stem projecting outward axially from said first engaging end face;
   a second threaded joint unit including a second male screw member sleeved rotatably around said stem and having a second engaging end face confronting said first engaging end face, said second male screw member being engageable threadedly with said female screw of the other one of said sections;
   a clamp member mounted on said stem adjacent to one end of said second male screw member opposite to said second engaging end face to clamp said second male screw member against said first male screw member; and
   a resilient member sleeved around said stem between said clamp member and said first male screw member and being compressible along an axial direction,
   said first male screw member being engageable resiliently with said second male screw member via said first and second engaging end faces and said resilient member, said resilient member permitting said first and second male screw members to disengage from each other for adjustment, and
   wherein said clamp member is a substantially C-shaped clamp plate.

2. The collapsible support rod as claimed in claim 1, wherein said sections have outer peripheral surfaces formed respectively with patterns.

3. The collapsible support rod as claimed in claim 1, wherein said resilient member includes a one-piece annular plate formed with a plurality of radially extending corrugations, said corrugations projecting from said annular plate alternately in two opposite axial directions.

4. The collapsible support rod as claimed in claim 3, wherein said resilient member is disposed between and in contact with said clamp plate and said second male screw member.

5. The collapsible support rod as claimed in claim 5, wherein each of said first and second engaging end faces includes a plurality of inclined teeth which project axially and extend radially, said first and second engaging end faces being interlockable via said inclined teeth.

6. The collapsible support rod as claimed in claim 4, wherein said resilient member is disposed between said first and second engaging end faces.

7. A collapsible support rod comprising:
   a least two sections each having at least one joint end formed with a female screw; and
   a first threaded joint unit including a first male screw member engageable threadedly with said female screw of one of said sections, a first engaging end face formed at one end of said first male screw member, and a stem projecting outward axially from said first engaging end face;

a second threaded joint unit including a second male screw member sleeved rotatably around said stem and having a second engaging end face confronting said first engaging end face, said second male screw member being engageable threadedly with said female screw of the other one of said sections;

a clamp member mounted on said stem adjacent to one end of said second male screw member opposite to said second engaging end face to clamp said second male screw member against said first male screw member; and a resilient member sleeved around said stem between said clamp member and said first male screw member and being compressible along an axial direction, said first male screw member being engageable resiliently with said second male screw member via said first and second engaging end faces and said resilient member, said resilient member permitting said first and second male screw members to disengage from each other for adjustment, and wherein each of said first and second engaging end faces includes a plurality of radially extending grooves, said corrugations of said resilient member projecting respectively into said grooves of said first and second engaging end faces.

* * * * *